Jan. 30, 1923. 1,443,870
G. McARTHUR ET AL.
WATER COOLING DEVICE FOR INTERNAL COMBUSTION ENGINES.
FILED SEPT. 9, 1920.
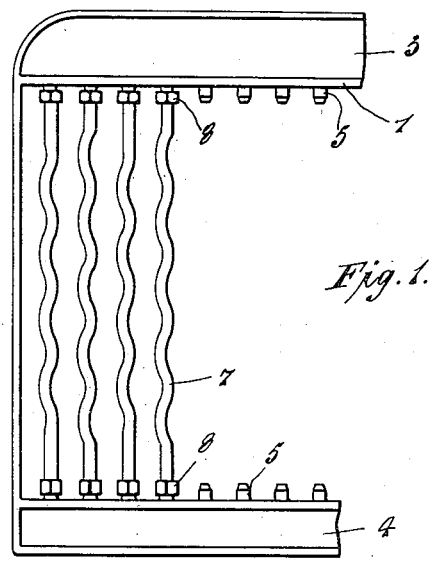
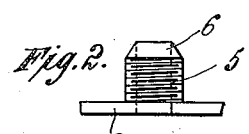
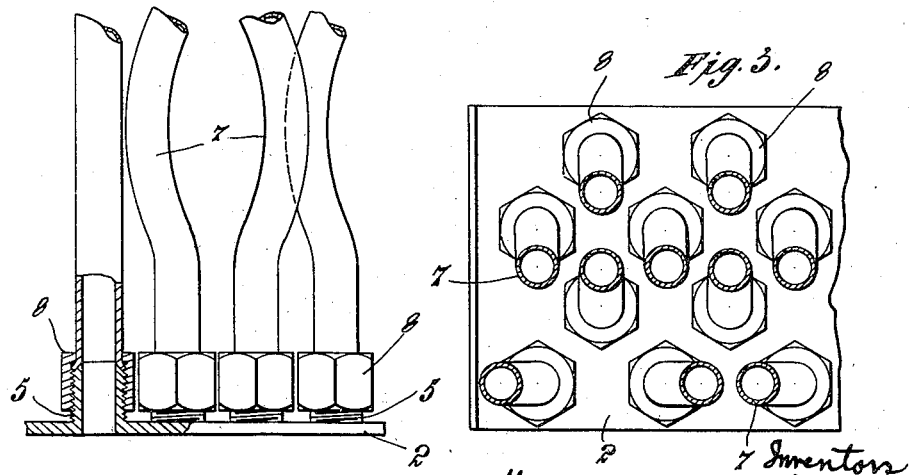

Patented Jan. 30, 1923.

1,443,870

UNITED STATES PATENT OFFICE.

GEORGE McARTHUR, CHARLES COLPUS, WALTER J. SCAMMELL, AND WILLIAM F. THOMPSON, OF WELLINGTON, NEW ZEALAND.

WATER-COOLING DEVICE FOR INTERNAL-COMBUSTION ENGINES.

Application filed September 9, 1920. Serial No. 409,280.

*To all whom it may concern:*

Be it known that we, GEORGE McARTHUR, CHARLES COLPUS, WALTER JOHN SCAMMELL, and WILLIAM FROST THOMPSON, subjects of the King of Great Britain and Ireland, residing in Wellington, in the Dominion of New Zealand, have invented a new and useful Improvement in Water-Cooling Devices for Internal-Combustion Engines; and we do hereby declare the following to be a full, clear, and exact description of the same.

This invention relates to water cooling radiators used in connection with internal combustion engines of the type wherein the cooling of the water is effected by a current of air passing around and through a circulating system in which a plurality of tubes are employed through which tubes the water flows and which are open to the atmosphere.

The object of the invention is to provide a system wherein the tubes may be easily inserted and removed so that should a tube become damaged or leak at the joint the defective tube may be removed and a fresh one inserted, or the openings to the reservoirs sealed without interfering with the circulating system.

In the present invention, a series of separate lengths of tubes are employed, which tubes may be straight, spiral or waved, but are preferably waved. These separate lengths are connected to openings in the bottom of the upper reservoir and in the top of the lower reservoir. Screwed nipples in the form of integral bosses are secured or cast around the openings referred to and a water-tight connection is made between the nipples and the waved tubes by means of nuts mounted on the tubes. The end of each nipple has a conical head while the inner periphery of the ends of the tube is conically flared and receives the conical head and is adapted to make a water-tight connection between the tube and the end of the nipple. A cupped nut is mounted on the tube behind the conically flared end, and when this nut is tightened on to the screwed nipple, the flared end of the tube will be forced over the conical end of the nipple and a water-tight joint secured. Each piece of tube thus forms a unit of the circulating and cooling system.

The invention is illustrated in the accompanying drawings, wherein:—

Figure 1, is a front view of the radiator of a motor-car.

Figure 2, is a view of a nipple.

Figure 3, is a plan showing the arrangement of the tubes.

Figure 4, is an end view of the tubes showing one of the joints in section.

Referring to the drawings, the walls 1 and 2 of the reservoirs 3 and 4 in a radiator are fitted with a number of screwed nipples 5 which are made integral with the walls 1 and 2 by any suitable means. The screwed nipples 5 are bored so as to communicate with the reservoirs 3 and 4 and have conical ends 6 over which fit internally flared ends of tubes 7. A cupped nut 8 is mounted upon each end of the tubes behind the flared portion and adapted to screw upon a screwed nipple 5 and when the nut is screwed down the flared end of the tube is forced into close contact with the conical end 6 and a water-tight joint made. The tubes are of softer metal than the screwed nipples so that as a nut is tightened the end of its accompanying tube will be forced to conform to the exact shape of the conical head.

The tubes 7 are waved throughout their length and this waving has a three-fold object, first to permit of the tubes being sprung into position over the conical ends of the screwed nipples 5 and to allow of the expansion of the tubes so that their ends may be drawn into close contact with the conical ends of the nipples, second to allow for the contraction or expansion of the tubes and third, to break up and distribute the current of air around the tubes.

It will be seen that a tube may be easily removed by unscrewing the nuts 8 at each end of the tube thus enabling a damaged tube to be quickly replaced without interfering with the circulating system.

The front row of tubes is arranged as indicated in Figures 1 and 3, that is, the waved portions are parallel with the front of the radiator, while the remaining rows of tubes have the waved portion arranged at right angles to the row in front. This arrangement breaks up the current of air flowing through and provides a better cooling arrangement.

What we claim is:—

1. In a cooling device for the purpose indicated an upper reservoir, a lower reservoir, tubes communicating from said upper to said lower reservoir, means for securing said tubes to said reservoirs whereby a watertight joint is made, the said tubes being waved whereby the ends of said tubes may be drawn tightly into position to secure a water tight joint, and be easily inserted and removed, one row of said tubes arranged so that the waved portion will be in the same plane, while the remaining rows of tubes will have their waved portions at right angles to the said first row, substantially as described.

2. In a cooling device for the purpose indicated an upper reservoir, a lower reservoir, screwed nipples integral with or fixed in the walls of said reservoirs, exterior conical ends on said screwed nipples, screwed tubes, internally flared conical ends to said tubes fitting over said conical ends of said screwed nipples, cupped nuts located behind the said flared ends of said tubes and screwing upon the said nipples whereby the ends of the tubes may be drawn tightly down upon the said conical ends of the said nipples, the front row of said tubes arranged so that the waved portion will be in the same plane, while the remaining rows of tubes will have the waved portion at right angles to the said front row of tubes, substantially as described.

3. A radiator for cooling systems of internal combustion engines comprising upper and lower reservoirs, waved tubes connecting said reservoirs, said waved tubes being arranged in rows, the waved portions of one row of tubes being arranged in the same plane and the waved portions of the remaining rows of tubes being arranged at a plane at right angles to the first mentioned row of tubes substantially as and for the purpose specified.

4. A radiator for cooling systems of internal combustion engines comprising an upper and lower reservoir, waved tubes arranged in staggered relation between said reservoirs and being connected thereto, several of the tubes having their waved portions extending in one vertical plane and the waved portions of the remaining tubes extending each in different vertical planes, substantially as and for the purpose specified.

In testimony whereof, we have signed our names to this specification in the presence of two subscribing witnesses.

GEORGE M'ARTHUR.
CHARLES COLPUS.
WALTER J. SCAMMELL.
WILLIAM F. THOMPSON.

Witnesses:
WILLIAM HENRY BOWDEN,
SYDNEY H. HIGGS.